(12) United States Patent
Jung et al.

(10) Patent No.: US 10,955,964 B2
(45) Date of Patent: Mar. 23, 2021

(54) ACTIVE PEN AND TOUCHSCREEN DISPLAY DEVICE

(71) Applicant: LG Display Co., Ltd., Seoul (KR)

(72) Inventors: DoYoung Jung, Paju-si (KR); HyungUk Jang, Paju-si (KR); SangHyuck Bae, Paju-si (KR); Sungsu Han, Paju-si (KR); Suyun Ju, Paju-si (KR); Jongsung Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/719,456

(22) Filed: Dec. 18, 2019

(65) Prior Publication Data
US 2020/0201505 A1 Jun. 25, 2020

(30) Foreign Application Priority Data
Dec. 20, 2018 (KR) .................. 10-2018-0166757

(51) Int. Cl.
*G06F 3/041* (2006.01)
*G06F 3/0354* (2013.01)
*G06F 3/038* (2013.01)

(52) U.S. Cl.
CPC ........ *G06F 3/04162* (2019.05); *G06F 3/0383* (2013.01); *G06F 3/03545* (2013.01); *G06F 3/0412* (2013.01); *G06F 3/0414* (2013.01)

(58) Field of Classification Search
CPC .................................................. G06F 3/04162
See application file for complete search history.

(56) References Cited

U.S. PATENT DOCUMENTS

| | | | | |
|---|---|---|---|---|
| 2005/0163092 A1* | 7/2005 | Suzuki | ................. | H04W 52/42 370/342 |
| 2017/0285771 A1* | 10/2017 | Jung | ....................... | G06F 3/044 |
| 2018/0120963 A1* | 5/2018 | Hara | ....................... | G06F 3/041 |

* cited by examiner

*Primary Examiner* — Gustavo Polo
(74) *Attorney, Agent, or Firm* — Polsinelli PC

(57) ABSTRACT

A touchscreen display device includes a display panel, a touch sensor, and a touch circuit. The touch sensor is disposed in an area corresponding to the display panel to output an uplink signal including signal intensity information regarding an intensity of a downlink signal output from an active pen. The touch circuit controls the touch sensor to output the uplink signal.

15 Claims, 19 Drawing Sheets

ACTIVE PEN AND TOUCHSCREEN DISPLAY DEVICE

CROSS REFERENCE TO RELATED APPLICATION

This application claims priority to Korean Patent Application No. 10-2018-0166757, filed on Dec. 20, 2018, which is hereby incorporated by reference in its entirety.

BACKGROUND

Field of the Disclosure

Exemplary aspects relate to an active pen and a touchscreen display device and a system comprising the active pen and the touchscreen display device.

Description of the Background

With the development of the information society, there has been increasing demand for a variety of image display devices. In this regard, a range of display devices, such as liquid crystal display (LCD) devices, plasma display devices (PDPs), and organic light-emitting diode (OLED) display devices, have recently come into widespread use.

Such display devices provide touch-based user interfaces enabling users to intuitively and conveniently input data or instructions directly to devices, rather than using conventional data input systems, such as buttons, a keyboard, or a mouse.

To provide such touch-based user interfaces, touchscreen display devices may be able to detect a user's touch and accurately determine touch coordinates.

In this regard, in the related art, a touchscreen display device may use one of a variety of touch sensing systems, such as resistive film type, capacitance type, electromagnetic induction type, infrared radiation (IR) type, and ultrasonic type touch sensing systems.

Among the plurality of touch sensing systems, the capacitance-type touch sensing system including a plurality of touch electrodes disposed in a touchscreen panel to detect a touch and touch coordinates on the basis of changes in capacitance between touch electrodes or between a touch electrode and a pointer, such as a finger, is widely used.

In addition, to facilitate the fabrication of touchscreen display devices and reduce the size of touchscreen display devices, a variety of attempts at embedding a touchscreen panel comprised of touch electrodes in a display panel have been conducted.

In addition, in response to increasing demand for an accurate pen touch input, other than fingers or the like, the development of an active pen touch technique is being undertaken. In addition, a power saving technique is also required, since the touchscreen display device and the active pen use electric power supplied from batteries.

SUMMARY

The present disclosure provides an active pen and a touchscreen display device having superior operating characteristics.

Also the present disclosure provides an active pen and a touchscreen display device that can reduce power consumption and a system comprising at least an active pen and a touchscreen display device.

According to an aspect of the present disclosure, a touchscreen display device may include: a display panel; a touch sensor disposed in an area corresponding to the display panel to output an uplink signal including signal intensity information regarding an intensity of a downlink signal output from an active pen; and a touch circuit controlling the touch sensor to output the uplink signal.

According to an aspect of the present disclosure, an active pen may include: a receiver circuit connected to a plurality of conductive tips to receive an uplink signal directed to the plurality of conductive tips; a transmitter circuit connected to at least one of the plurality of conductive tips to output a downlink signal corresponding to signal intensity information to a touchscreen display device via at least one conductive tip among the plurality of conductive tips; and a pen controller transferring the signal intensity information included in the uplink signal to the transmitter circuit.

In another aspect of the present disclosure, a touchscreen display device is provided, comprising: a display panel; a plurality of touch sensors disposed in the display panel to detect a signal output from an active pen and/or a finger touch in a touch sensing period of the display panel and to output an uplink signal in an uplink signal output period of the display panel; and a touch circuit controlling the plurality of touch sensors to output the uplink signal, wherein the uplink signal includes information regarding a driving mode of the active pen according to a distance between a tip of the active pen and a touch sensor of the plurality of touch sensors.

In some aspects, the touch sensor may be configured to output a position information signal corresponding to a touched position on the display panel in response to the downlink signal to the touch circuit, and the touch circuit may be configured to receive the position information signal from the touch sensor in response to the downlink signal output from the active pen.

In some aspects, the touchscreen display device may further comprise a timing controller configured to control the driving of the display panel.

The timing controller may be configured to control an image to be displayed on the display panel, in particular, to display an image in response to the position information.

In some aspects, the signal intensity information may include information regarding at least one of information regarding the number of pulses of the downlink signal, a voltage level of the downlink signal, and the number of conductive tips generating the downlink signal among a plurality of conductive tips of the active pen.

In some aspects, the touchscreen display device may further comprise a first communications module configured to receive status information of the active pen.

In some aspects, the uplink signal may further include a pen ID of the active pen.

In some aspects, at least one display period and at least one signal detection period are repeatedly disposed in a one-frame period.

The uplink signal may be output in uplink signal output periods of the signal detection periods and/or a signal output to the active pen may be detected in touch sensing periods of the signal detection periods.

The touch sensing periods may be time-divided into first touch sensing periods and second touch sensing periods.

The downlink signal corresponds to a first active pen among the plurality of active pens in the first touch sensing periods and corresponds to a second active pen among the plurality of active pens in the second touch sensing periods.

The signal detection periods may include a period in which the touch sensor is configured to detect the downlink signal transferred from the active pen and/or a period in which the touch sensor is configured to detect a finger touch.

The touch circuit is configured to obtain information regarding an inclination of the active pen corresponding to the downlink signal output from a plurality of conductive tips of the active pen.

The uplink signal may include information regarding a driving mode of the active pen according to a distance between the active pen and the display panel.

The information regarding the driving mode of the active pen may include information regarding at least one of the number of pulses of the downlink signal, a voltage level of the downlink signal, the number of conductive tips generating the downlink signal among a plurality of conductive tips of the active pen, and an active pen ID of the active pen.

The uplink signal output period may be time-divided into a first uplink signal output period and a second uplink signal output period.

The uplink signal output in the first uplink signal output period may correspond to a first active pen among the plurality of active pens, and the uplink signal output in the second uplink signal output period may correspond to a second active pen among the plurality of active pens.

In another aspect an active pen is provided comprising: a receiver circuit connected to a plurality of conductive tips to receive an uplink signal directed to the plurality of conductive tips; a transmitter circuit connected to the plurality of conductive tips to output a downlink signal corresponding to signal intensity information to a touchscreen display device via at least one conductive tip among the plurality of conductive tips; and a pen controller transferring the signal intensity information included in the uplink signal to the transmitter circuit.

The active pen may further comprise a pressure sensor detecting a pressure applied to one conductive tip among the plurality of conductive tips; and/or a distance sensor calculating a distance from the touchscreen display device according to a signal intensity of the uplink signal received by the receiver circuit.

The transmitter circuit may transfer pressure information regarding the pressure detected by the pressure sensor or distance information regarding the distance from the touchscreen display device, calculated by the distance sensor, to the touchscreen display device.

The active pen may further comprise a memory having an active pen ID stored therein.

The active pen may further comprise at least two conductive tips.

The active pen may be operated in a contact mode and a hover mode.

The active pen may include at least one or a plurality of conductive tips.

The signal intensity information may include information regarding at least one of a voltage level of the downlink signal, the number of pulses of the downlink signal, and the number of conductive tips generating the downlink signal among the plurality of conductive tips.

In another aspect, a touch sensing system is provided comprising an active pen and a touchscreen display device as described above.

In another aspect, a touch sensing system is provided comprising a touchscreen display device and at least one active pen, wherein the touchscreen display device includes a touch sensor configured to output an uplink signal to the active pen, the active pen is configured to output a downlink signal to the touchscreen display device, wherein the distance between the touch sensor and a tip of the active pen is calculated based on a signal intensity of the uplink signal and/or downlink signal, wherein the operation mode of the active pen is set based on the calculated distance. According to exemplary aspects, the active pen and the touchscreen display device may have superior operating characteristics.

According to exemplary aspects, the active pen and the touchscreen display device can reduce power consumption.

BRIEF DESCRIPTION OF THE DRAWINGS

The above and other objects, features, and advantages of the present disclosure will be more clearly understood from the following detailed description, taken in conjunction with the accompanying drawings, in which.

DETAILED DESCRIPTION

Figure 1:
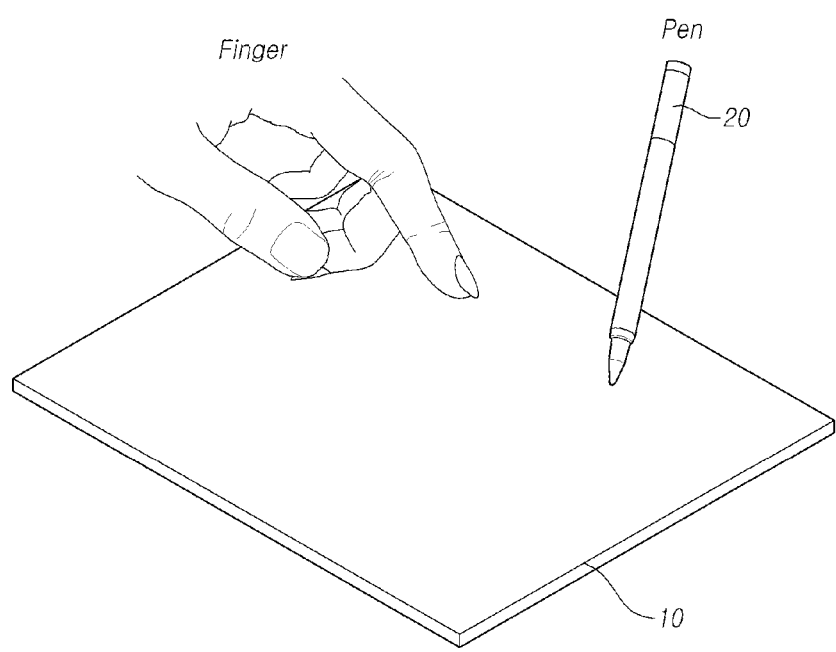
FIG. 1 illustrates a touch sensing system according to the present disclosure.

The advantages and features of the present disclosure and methods of the realization thereof will be apparent with reference to the accompanying drawings and detailed descriptions of the aspects. The present disclosure should not be construed as being limited to the aspects set forth herein and may be embodied in many different forms. Rather, these aspects are provided so that the present disclosure will be thorough and complete, and will fully convey the scope of the present disclosure to a person having ordinary skill in the art. The scope of the present disclosure shall be defined by the appended Claims.

The shapes, sizes, ratios, angles, numbers, and the like, inscribed in the drawings to illustrate exemplary aspects are illustrative only, and the present disclosure is not limited to the aspects illustrated in the drawings. Throughout this document, the same reference numerals and symbols will be used to designate the same or like components. In the following description of the present disclosure, detailed descriptions of known functions and components incorporated into the present disclosure will be omitted in the case that the subject matter of the present disclosure may be rendered unclear thereby. It will be understood that the terms "comprise," "include," "have," and any variations thereof used herein are intended to cover non-exclusive inclusions unless explicitly described to the contrary. Descriptions of components in the singular form used herein are intended to include descriptions of components in the plural form, unless explicitly described to the contrary.

In the analysis of components according to aspects, it shall be understood that an error range is included therein, even in the case in which there is no explicit description thereof.

It will also be understood that, while terms, such as "first," "second," "A," "B," "(a)," and "(b)," may be used herein to describe various elements, such terms are merely used to distinguish one element from other elements. The substance, sequence, order, or number of such elements is not limited by these terms. It will be understood that when an element is referred to as being "connected," "coupled," or "linked" to another element, not only can it be "directly connected, coupled, or linked" to the other element, but it can also be "indirectly connected, coupled, or linked" to the other element via an "intervening" element. In the same context, it will be understood that when an element is referred to as being formed "on" or "under" another element, not only can it be directly located on or under the other element, but it can also be indirectly located on or under the other element via an intervening element.

It should be understood, however, that the components according to aspects are not limited by these terms. These terms are merely used to discriminate one element or component from other elements or components. Thus, a component referred to as first component hereinafter may be a second component within the basic idea of the present disclosure.

The features of exemplary aspects of the present disclosure may be partially or entirely coupled or combined with each other and may work in concert with each other or may operate in a variety of technical methods. In addition, respective exemplary aspects may be carried out independently or may be associated with and carried out in concert with other aspects.

Hereinafter, exemplary aspects will be described in detail with reference to the accompanying drawings.

FIG. 1 illustrates a touch sensing system according to aspects.

Referring to FIG. 1, the touch sensing system according to aspects may include a touchscreen display device 10 and an active pen 20 working in concert with the touchscreen display device 10.

The touchscreen display device 10 according to aspects can provide not only an image display function to display images but also a touch sensing function to detect a touch performed using a finger and/or a pen, or the like.

The term "pen" used herein may include an active pen, i.e. a touch tool having a signal transceiving function, able to work in concert with the touchscreen display device 10, or including a self-power source, and a passive pen, i.e. a touch tool without a signal transceiving function or a self-power source.

The term "touch tool" used herein means not only a finger, but also any object that can be used in place of a finger to touch a screen of the display device 10 on which an image is displayed. The touch tool may also be referred to as a touch object or a touch pointer.

In addition, a finger may be regarded as representing the passive touch tool, such as the passive pen, while the active pen 20 may be regarded as representing the active touch tool. The active pen 20 may also be referred to as a stylus, a stylus active pen, an active stylus pen, or the like.

The touchscreen display device 10 according to aspects may be, for example, a television (TV), a monitor, or a mobile device, such as a tablet computer or a smartphone. However, the touchscreen display device is not limited thereto.

Figure 2:
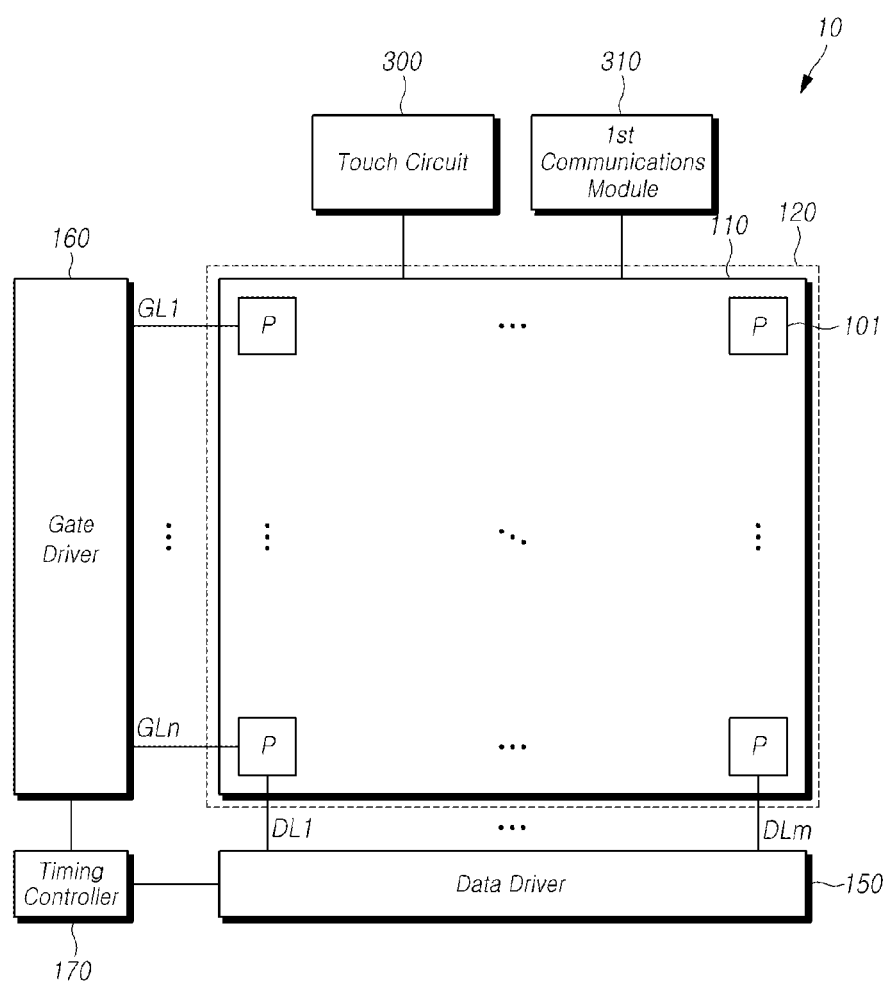
FIG. 2 is a schematic view illustrating an aspect of the touchscreen display device used in the touch sensing system illustrated in FIG. 1.

FIG. 2 is a schematic view illustrating an aspect of the touchscreen display device used in the touch sensing system illustrated in FIG. 1.

Referring to FIG. 2, the touchscreen display device 10 may include a display panel 110, a touch sensor 120 disposed in an area corresponding to the display panel 110 to detect a touch, and a touch circuit 300 driving the touch sensor 120.

The display panel 110 may include a plurality of data lines DL1, . . . , and DLm disposed in a first direction and a plurality of gate lines GL1, . . . , and GLn disposed in a second direction. The plurality of data lines DL1, . . . , and DLm may perpendicularly intersect the plurality of gate lines GL1, . . . , and GLn. However, the present disclosure is not limited thereto. The display panel 110 may include a plurality of pixels 101 defined in areas corresponding to areas in which the plurality of gate lines GL1, . . . , and GLn intersect the plurality of data lines DL1, . . . , and DLm. The lines disposed in the display panel 110 are not limited to the plurality of data lines DL1, . . . , and DLm and the plurality of gate lines GL1, . . . , and GLn.

The display panel 110 can display an image in response to a voltage between a first electrode and a second electrode. The second electrode may include a touch electrode, in particular a first touch electrode and a second touch electrode. In addition, the display panel 110 may include pixel circuits, pixel electrodes, and common electrodes, and may display an image in response to a voltage applied to the pixel electrodes from the pixel circuits. The voltage applied to the pixel electrodes may correspond to a data signal. The pixel electrodes may be provided for the pixels, respectively, and the common electrode may be provided to correspond to at least two pixels. However, the present disclosure is not limited thereto.

In another example, each of the pixels 101 may include a pixel circuit and an organic light-emitting diode (OLED). The pixel circuit may supply a driving current to the OLED in response to a data signal, while the OLED may include an anode, a cathode, and an organic light-emitting layer disposed between the anode and the cathode. The OLED may emit light from the organic light-emitting layer in response to the driving current flowing from the anode to the cathode.

In addition, the display panel 110 may be operated in different operating periods, one of the operating periods is a touch sensing period, in which a signal output from the active pen 20 or a finger touch is detected, and another period is an uplink signal output period, in which an uplink signal is output. Other operating periods may relate to the display function.

The touch sensor 120 may be disposed in the area corresponding to the display panel 110. The position corresponding to the display panel 110 may be a location above the display panel 110, but is not limited thereto. The touch sensor 120 may be also integrated in the display panel 110. The touch sensor 120 may generate position information regarding a touched point on the display panel 110. The touch sensor 120 may detect a change in capacitance to generate the position information regarding the touched point. The touch detected by the touch sensor 120 may be generated by directly touching a single point on the display panel 110 of the touchscreen display device 10 with a finger or the active pen 20, as illustrated in FIG. 1, or stimulating the touch sensor 120 by applying an electrical signal thereto in a position in which a finger or the active pen 20 is spaced apart from the touchscreen display device 10 by a certain distance. The touch sensor 120 may correspond to a touchscreen panel TSP, which will be described later with reference to FIGS. 3 to 5.

The electrical stimulation of the touch sensor 120 in a position in which a finger or the active pen 20 is spaced apart from the touchscreen display device 10 by a certain distance may be referred to as hover, since a finger or the active pen 20 does not directly touch the display panel 110. For example, the active pen 20 may apply an electrical signal to the touch sensor 120 while being spaced apart from the display panel 110 by a certain distance.

The touch sensor 120 may output an uplink signal including signal intensity information regarding a downlink signal output from the active pen 20 and/or a position information signal including position information regarding a touched position of the display panel 110. The uplink signal may further include an active pen identifier (ID) of the active pen. The downlink signal may be a signal stimulating the touch sensor 120. However, the present disclosure is not limited thereto. For example, the uplink signal may refer to a signal transferring from the touchscreen display device 10 to the active pen 20, and the downlink signal may refer to a signal transferring from the active pen 20 to the touchscreen display device 10. The signal intensity information may include information regarding at least one of the number of pulses of the downlink signal, a voltage level of the downlink signal, and the number of conductive tips generating the downlink signal among a plurality of conductive tips of the active pen.

In addition, the touch sensor 120 may detect a signal representing a touch output from the active pen 20 and/or a finger touch in a touch sensing period of the display panel 110 and output the uplink signal in a following uplink signal output period of the touchscreen display device 10.

In addition, in a case in which each of the pixels 101 includes a pixel electrode and a common electrode, the touch sensor 120 may include the common electrode included in the pixel 101. In a case in which the pixel 101 includes an OLED, the touch sensor 120 may include the cathode of the OLED.

The touch circuit 300 may drive the touch sensor 120. The touch circuit 300 may control the touch sensor 120 to generate and/or output the uplink signal. The uplink signal may include information regarding the driving mode of the active pen 20 according to the distance between the active pen 20 and the display panel 110. The information regarding the driving mode of the active pen 20 may include information regarding at least one of the number of pulses of the downlink signal, the voltage level of the downlink signal, and the number of conductive tips generating the downlink signal among a plurality of conductive tips of the active pen. In addition, the touch circuit 300 may detect the touch in response to the downlink signal output from the active pen 20. In addition, in a case in which the active pen 20 has at least two or a plurality of conductive tips, the touch circuit 300 may obtain information regarding the inclination of the active pen 20 corresponding to the downlink signal output from the two or the plurality of conductive tips.

The touch circuit 300 may receive the position information signal, including information regarding the position touched on the display panel 110, from the touch sensor 120. However, the present disclosure is not limited thereto, and the position information may include information regarding the intensity of force with which the display panel 110 is touched. In addition, the touch circuit 300 may obtain information regarding the position touched on the display panel 110, in response to a change in capacitance in the touch sensor 120 caused by a finger or the active pen 20 having directly touched the display panel 110.

According to an aspect, the touchscreen display device 10 may further include a first communications module 310 to receive status information of the active pen 20. The status information of the active pen 20 may be included in the downlink signal. However, in a case in which the touchscreen display device 10 includes the first communications module 310, the status information of the active pen 20 may be transferred to the first communications module 310 instead of being transferred to the touch sensor 120. The status information of the active pen 20 may include information regarding the distance between the active pen 20 and the touchscreen display device 10. However, the status information of the active pen 20 is not limited thereto, and may include any other status information that might be apparent to persons skilled in the art.

The distance information may be detected using a pressure applied to the touchscreen display device 10 or an intensity of the uplink signal. The first communications module 310 may obtain status information by communicating with the active pen 20 using short range wireless communication, e.g. near-field communication. When the first communications module 310 and the active pen 20 are paired, the first communications module 310 can communicate with and receive the status information from the active pen 20. For example, the first communications module 310 may use a Bluetooth module to communicate with the active pen 20. However, the present disclosure is not limited thereto. Although the first communications module 310 is illustrated as being a component separate from the touch circuit 300, the first communications module 310 is not limited thereto. Rather, the first communications module 310 may be included in the touch circuit 300.

The touchscreen display device 10 may further include a data driver 150 to drive the display panel 110. The data driver 150 may apply a data signal to the plurality of data lines DL1, . . . , and DLm. The data signal may correspond to a grayscale, and the voltage level thereof may be determined depending on the corresponding grayscale. The voltage of the data signal may be referred to as a data voltage. Although the data driver 150 is illustrated as a single data driver, the data driver 150 is not limited thereto. Two or more data drivers 150, corresponding to the size and resolution of the display panel 110, may be provided. In addition, the data driver 150 may be provided as an integrated circuit (IC).

The touchscreen display device 10 may further include a gate driver 160 to drive the display panel 110. The gate driver 160 may apply a gate signal to the plurality of gate lines GL1, . . . , and GLn. The pixels 101, corresponding to the plurality of gate lines GL1, . . . , and GLn to which the gate signal is applied, may receive the data signal. Although the gate driver 160 is illustrated as being a single gate driver, the gate driver 160 is not limited thereto. At least two gate drivers 160 may be provided. In addition, the gate drivers 160 may be disposed on both sides of the display panel 110, with the gate driver 160 at one side of the display panel 110 being connected to odd-numbered gate lines among the plurality of gate lines GL1, . . . , and GLn, and the gate driver 160 at the other side of the display panel 110 being connected to even-numbered gate lines among the plurality of gate lines GL1, . . . , and GLn. However, the present disclosure is not limited thereto.

In addition, the signal output from the gate driver 160 is not limited to the gate signal. The gate driver 160 may include a gate signal generating circuit (not shown) disposed in the display panel 110 to output the gate signal and a level shifter (not shown) supplying a voltage and a signal to the gate signal generating circuit. The structure of the gate driver 160 is not limited thereto.

The touchscreen display device 10 may further include a timing controller 170 to drive the display panel 110. The timing controller 170 can control the data driver 150 and the gate driver 160. The timing controller 170 may control an image to be displayed on the display panel 110, depending on the position information regarding the touched position. For example, a line, point or circle may be displayed, corresponding to the touched position. However, the present disclosure is not limited thereto. In addition, the timing controller 170 may transfer the image signal, transferred from an external source, to the data driver 150. The image signal may be a digital signal. The timing controller 170 may correct the received image signal before transferring the image signal to the data driver 150.

It is to be noted that, although the structure of the touchscreen display device 10 is described in detail with reference to the LCD display device and OLED display device, but the present disclosure is not limited thereto, and any other display device may also be used as a part of the touchscreen display device 10.

Figure 3:
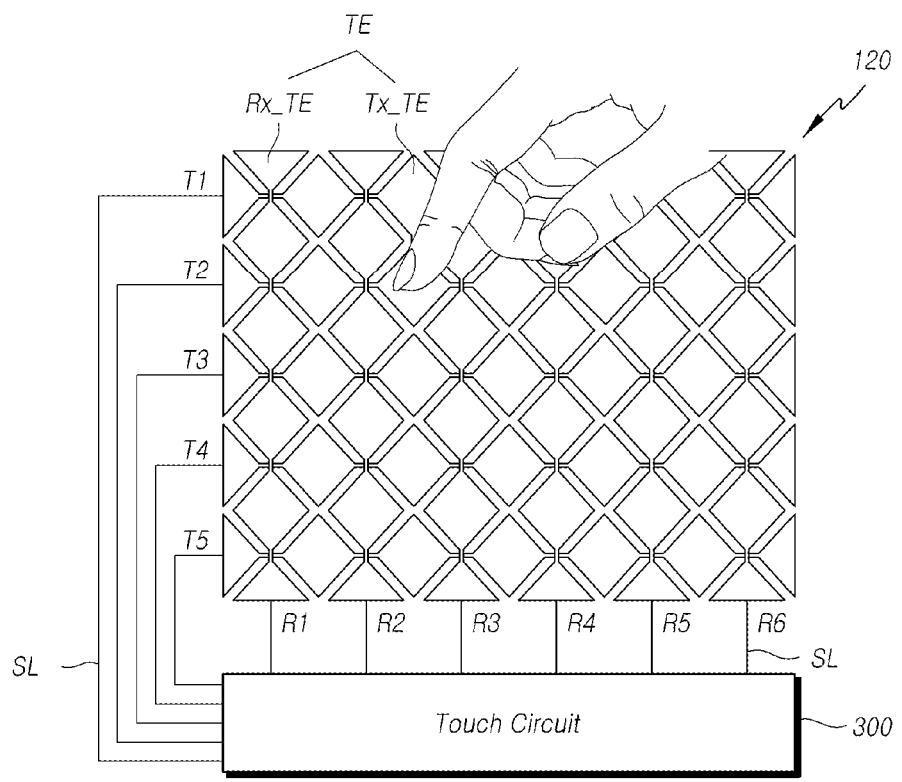
FIG. 3 is a schematic view illustrating a first aspect of the touch sensor and the touch circuit illustrated in FIG. 1.
Figure 4:
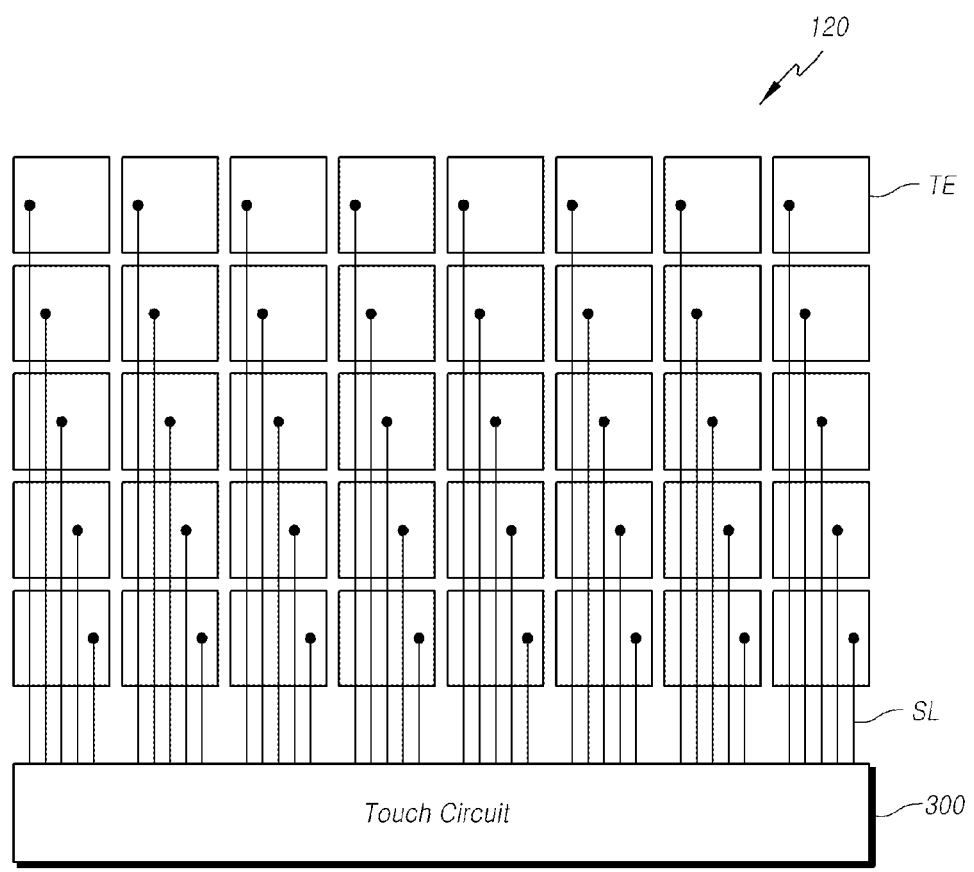
FIG. 4 is a schematic view illustrating a second aspect of the touch sensor and the touch circuit illustrated in FIG. 1.
Figure 5:
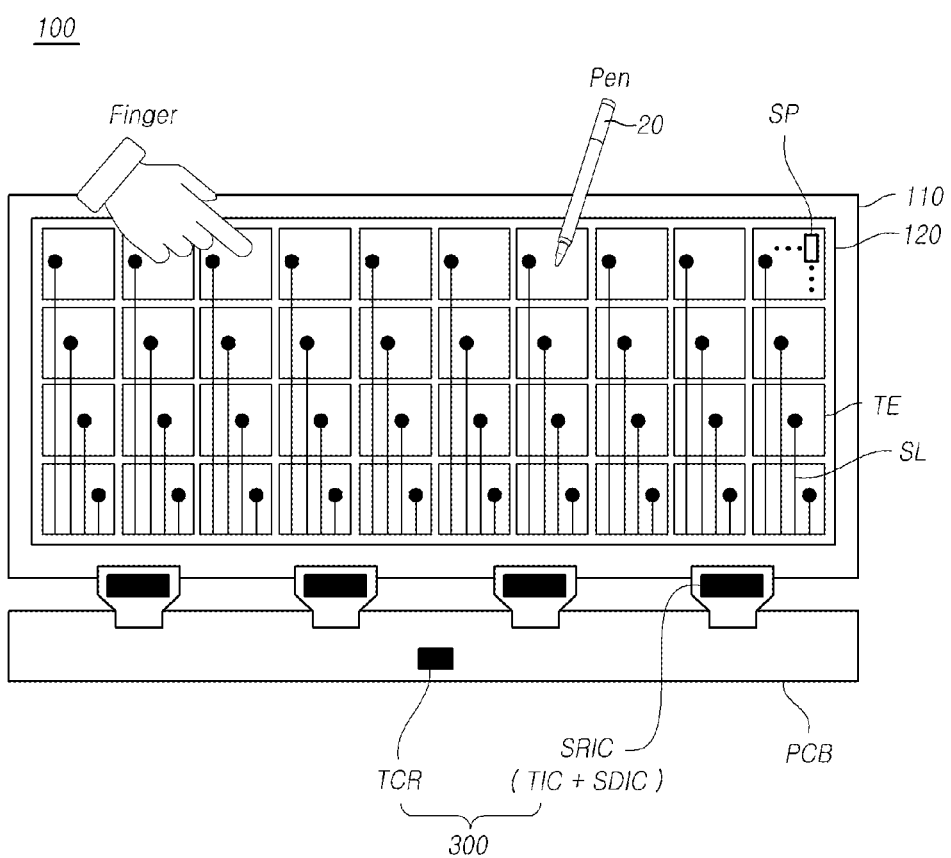
FIG. 5 is a schematic view illustrating a third aspect of the touch sensor and the touch circuit illustrated in FIG. 1.

FIG. 3 is a schematic view illustrating a first aspect of the touch sensor and the touch circuit illustrated in FIG. 1, and FIG. 4 is a schematic view illustrating a second aspect of the touch sensor and the touch circuit illustrated in FIG. 1. In addition, FIG. 5 is a schematic view illustrating a third aspect of the touch sensor and the touch circuit illustrated in FIG. 1.

Referring to FIG. 3, in the touchscreen panel TSP, first touch electrode lines T1 to T5 (also referred to as touch driving lines), to which a touch driving signal is applied, are disposed to intersect second touch electrode lines R1 to R6 (also referred to as touch sensing lines), to which the touch sensing signal is applied, such that mutual capacitance touch sensing, i.e. touch sensing based on mutual capacitance, is enabled.

Each of the first touch electrode lines T1 to T5 may be a single bar-shaped electrode extending in a horizontal direction, while each of the second touch electrode lines R1 to R6 may be a single bar-shaped electrode extending in a vertical direction.

Alternatively, as illustrated in FIG. 3, each of the first touch electrode lines T1 to T5 may be provided by electrically connecting first touch electrodes Tx_TE (also referred to as touch driving electrodes) disposed in a single row. Each of the second touch electrode lines R1 to R6 may be provided by electrically connecting second touch electrodes Rx_TE (also referred to as touch sensing electrodes) disposed in a single column.

Each of the first touch electrode lines T1 to T5 may be electrically connected to the touch circuit 300 through one or more signal lines SL. Each of the second touch electrode lines R1 to R6 may be electrically connected to the touch circuit 300 through one or more signal lines SL.

Referring to FIG. 4, a plurality of touch electrodes TE may be disposed in the touchscreen panel TSP, such that self-capacitance touch sensing, i.e. touch sensing based on self-capacitance, is enabled.

A touch driving signal may be applied to, and a touch sensing signal may be detected from, each of the plurality of touch electrodes TE.

Hereinafter, for the sake of brevity, a case, in which the touchscreen display device 10 provides the self-capacitance touch sensing and the touchscreen panel TSP is designed as illustrated in FIG. 4 for the self-capacitance touch sensing, will be described.

Referring to FIG. 5, one or more touch ICs TIC supplying a touch driving signal to the touchscreen panel TSP and detecting (or receiving) a touch sensing signal from the touchscreen panel TSP, a touch controller TCR determining at least one of a touch input or a touched position using the result of detecting the touch sensing signal by the touch ICs TIC, and the like, may be provided.

The one or more touch ICs TIC, included in the touch circuit 300, may be provided as separate components or a single component.

In addition, the one or more touch ICs TIC, included in the touch circuit 300, may be integrated with one or more source driver ICs SDIC to provide one or more combined integrated circuits SRIC.

That is, the touchscreen display device 10 may include one or more combined ICs SRIC, each of which may include a touch IC TIC and a source driver IC SDIC.

Due to the above-described combining of the touch ICs TIC for the touch driving and the source driver ICs SDIC for the data driving, the touch driving and the data driving can be more efficiently performed. This is in particular true if the touchscreen panel TSP is embedded in the display panel 110 and the signal lines SL, connected to the touch electrodes TE, are disposed parallel to the data lines DL.

In a case in which the touchscreen panel TSP is embedded in the display panel 110, the touch electrodes TE may be provided in a variety of manners.

In a case in which the touchscreen display device 10 is a liquid crystal display (LCD) touchscreen display device, the touch electrodes TE may be, for example, electrodes, to which the touch driving signal is applied, or from which the touch sensing signal is detected, during a signal detection period for the touch sensing. The touch electrodes TE may also serve as blocked common electrodes, to which a common voltage is applied during a display driving period in which an image is displayed.

In this case, during the display driving period, the entirety of the touch electrodes TE may be electrically connected to each other within the touch circuit 300, and may have the common voltage applied thereto.

During the signal detection period following the display driving period, a portion or the entirety of the touch electrodes TE within the touch circuit 300 may be selected, and the touch IC TIC of the touch circuit 300 may apply the touch driving signal to or detect the touch sensing signal from one or more touch electrodes TE selected as above.

In addition, the touch electrodes TE may have a plurality of slits (also referred to as holes) to generate an electric field together with the pixel electrodes in the plurality of subpixels.

In a case in which the touchscreen display device 10 is an OLED touchscreen display device, the plurality of touch electrodes TE and the plurality of signal lines SL may be disposed on an encapsulation layer disposed on the common electrode (e.g. cathodes), which is disposed on the front surface of the display panel 110, and to which the common voltage is applied.

Here, for example, the common electrode, disposed on the front surface of the display panel 110, may be a cathode provided together with an anode (corresponding to the pixel electrode) in the OLED in each of the subpixels SP, and the common voltage may be a cathode voltage.

In this case, each of the plurality of touch electrodes TE may be a bulk electrode without an open area. Here, each of the plurality of touch electrodes TE may be a transparent electrode, such that light can be emitted from the subpixels SP.

Alternatively, each of the plurality of touch electrodes TE may be a mesh electrode having a plurality of open areas. The open areas in each of the plurality of touch electrodes TE may correspond to emission areas of the subpixels SP (e.g. areas in which portions of the anode are located).

When a panel driving signal is being applied to the touch electrodes TE and the signal lines SL during the signal detection period (or touch sensing period), a signal the same as or corresponding to the panel driving signal may be applied to the touch electrodes TE and signal lines SL, as well as other electrodes and signal lines, to which the panel driving signal is applied. Herein, the panel driving signal may also be referred to as the touch driving signal by which a touch input to the active pen 20 using at least one of a finger or the active pen 20 is detected or active pen information regarding the active pen 20 is recognized.

In an example, during the signal detection period, the panel driving signal or a signal corresponding thereto may be applied to a portion or the entirety of the data lines.

In another example, during the signal detection period, the panel driving signal or a signal corresponding thereto may be applied to a portion or the entirety of the gate lines.

In another example, during the signal detection period, the panel driving signal or a signal corresponding thereto may be applied to the entirety of the touch electrodes TE.

In addition, according to aspects, the panel driving signal may be any signal applied to the touchscreen panel TSP, the display panel 110, or the display panel 110 in which the touchscreen panel TSP is embedded.

Regarding the provision and location of the integrated circuit, for example, in the touchscreen display device 10, the combined ICs SRIC may be mounted on films, both ends of which are connected to the touchscreen panel TSP and a printed circuit board PCB.

As described above, through the signal lines on or in the films, the combined ICs SRIC having a chip-on-film (COF) structure may be electrically connected to the touchscreen panel TSP and/or to the touch controller TCR mounted on the printed circuit board PCB.

Each of the combined ICs SRIC may be implemented using a chip-on-film (COF) structure disposed on the touchscreen panel TSP.

In addition, the one or more touch ICs TIC and the touch controller TCR of the touch circuit 300 may be integrated in a single component.

The shape of the touch electrodes TE, illustrated in FIGS. 3 to 5, is merely illustrative, but the present disclosure is not limited thereto.

The size of an area in which a single touch electrode TE is provided may be greater than the size of an area in which a single subpixel SP is provided, as illustrated in FIG. 5. For example, the size of the area in which the single touch electrode TE is provided may correspond to the size of areas of several to tens of subpixels SP. In this case, the single touch electrode TE may overlap with two or more data lines and two or more gate lines. However, the present disclosure is not limited thereto, but the size of the area in which the single touch electrode TE is provided may correspond to the size of an area in which a single subpixel SP is provided.

In addition, the touchscreen panel TSP may be an external touchscreen panel (also referred to as an add-on touchscreen panel) fabricated separately from and connected to the display panel 110 or an embedded touchscreen panel (also referred to as an in-cell touchscreen panel or an on-cell touchscreen panel) embedded in the display panel 110.

Figure 6:
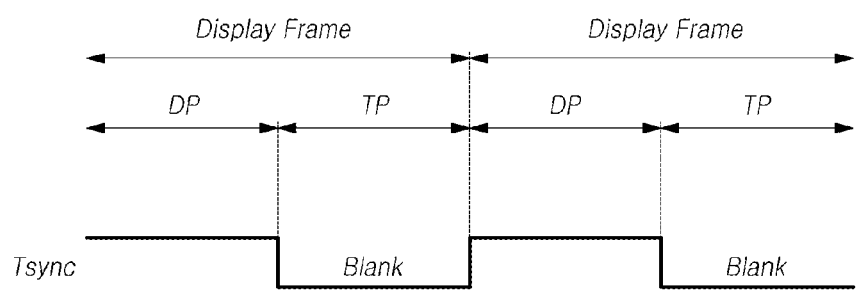
FIG. 6 is a timing diagram illustrating display driving periods and signal detection periods in the touchscreen display device according to the present disclosure.
Figure 7:
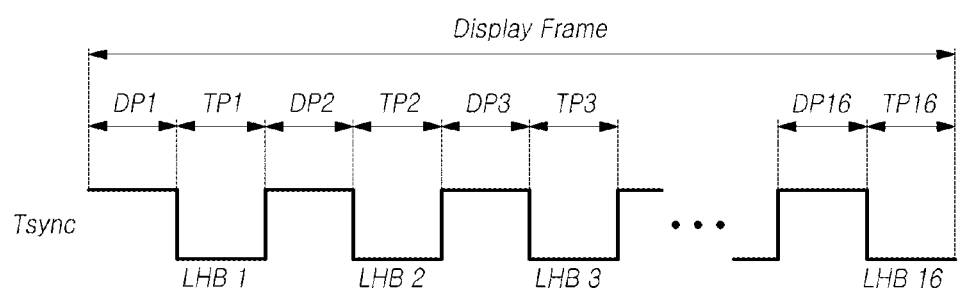
FIG. 7 is a conceptual view illustrating display driving periods and signal detection periods produced by dividing a one-frame period by time division in the touchscreen display device according to the present disclosure.

FIG. 6 is a timing diagram illustrating display driving periods and signal detection periods in the touchscreen display device according to aspects, and FIG. 7 is a conceptual view illustrating display driving periods and signal detection periods produced by dividing a one-frame period by time division in the touchscreen display device according to aspects.

Referring to FIGS. 6 and 7, the touchscreen display device 10 according to aspects can perform display driving to display an image during predetermined display driving periods DP while detecting a signal to sense a touch pressure applied by at least one of a finger or the active pen 20 during predetermined signal detection periods TP.

The display driving periods DP and the signal detection periods TP may be produced by dividing a single frame Display Frame by time division. In the one-frame period Display Frame, the display driving periods DP and the signal detection periods TP may be repeatedly disposed to alternate with each other. However, the present disclosure is not limited thereto, and the display driving periods DP and the signal detection periods TP may be separated from each other with predetermined time intervals. In addition, the display driving periods DP and the signal detection periods TP may be temporally equal periods or periods, portions of which overlap with each other. In a case in which the display driving periods DP and the signal detection periods TP are temporally equal periods, the display driving and the signal detection may be performed simultaneously.

In addition, the plurality of signal detection periods TP may include uplink signal detection periods and position information signal detection periods. The touch sensor 120 may output an uplink signal in uplink signal detection periods and output a position information signal in position information signal detection periods.

In a case in which the display driving periods DP and the signal detection periods TP are repeatedly disposed and temporally separated from each other, the signal detection periods TP may correspond to blank periods Blank in which no display driving is performed. For example, some of the plurality of blank periods Blank, included in the one-frame period, may be signal detection periods TP. The one-frame period may include a plurality of horizontal periods. The horizontal periods mean periods in which a data signal, corresponding to a single row of pixels among a plurality of pixels arrayed in the form of a matrix, is transferred. In addition, the one-frame period Display Frame means a period in which the data signal is transferred to all pixels of the display panel 110. Thus, in the one-frame period Display Frame, the data signal may be input to the entirety of the display panel 110.

In addition, the blank periods Blank may be disposed to alternate with the horizontal periods. Some of the plurality of blank periods Blank may be set to be longer than the remaining blank periods Blank. The blank periods longer than the remaining blank periods may be referred to as long horizontal blank periods (LHBs). Sixteen (16) LHB periods may be present in the one-frame period Display Frame. However, the number of the LHB periods is not limited thereto. Each LHB period may correspond to a single signal detection period TP. However, the present disclosure is not limited thereto.

The touchscreen display device 10 can generate a synchronization signal Tsync swinging between a high level and a low level to identify or control the display driving periods DP and the signal detection periods TP. That is, the synchronization signal Tsync may be a driving timing control signal by which the signal detection periods TP are defined. However, the present disclosure is not limited thereto.

In addition, high level periods (or low level periods) of the synchronization signal Tsync may correspond to the display driving periods DP, while low level periods (or high level periods) of the synchronization signal Tsync may correspond to the LHB periods corresponding to the signal detection periods TP. A single display driving period may be time-divided into sixteen display driving periods DP1 to DP16 and sixteen signal detection periods TP1 to TP16. In this case, the sixteen signal detection periods TP1 to TP16 may correspond to the sixteen LHB periods LHB1 to LHB16.

The signal detection periods TP of the display panel 110 may include uplink signal output periods in which the uplink signal is output and touch sensing periods in which a signal output from the active pen 20 or a finger touch is detected. In addition, in a case in which a plurality of active pens are used, the touch sensing periods are time-divided into first touch sensing periods and second touch sensing periods. In the first touch sensing periods, the downlink signal may correspond to a first active pen. In the second touch sensing periods, the downlink signal may correspond to a second active pen.

Figure 8:
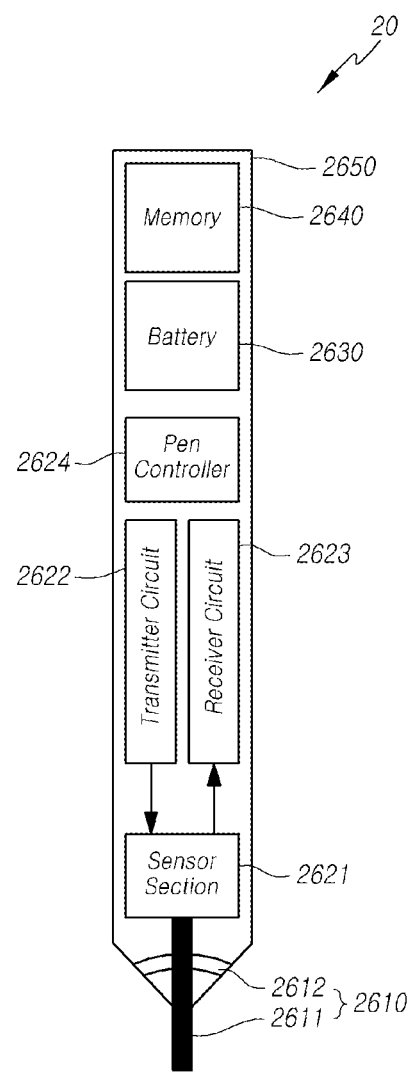
FIG. 8 is a schematic view illustrating the active pen according to the present disclosure.

FIG. 8 is a schematic view illustrating the active pen according to aspects.

Referring to FIG. 8, the active pen 20 working in concert with the touchscreen display device 10 may include plurality of conductive tips 2611 and 2612. The active pen 20 may include: a receiver circuit 2623 connected to the plurality of conductive tips 2611 and 2612 to receive an uplink signal directed to the plurality of conductive tips 2611 and 2612; a transmitter circuit 2622 connected to the plurality of conductive tips 2611 and 2612 to output a downlink signal corresponding to signal intensity information to the touchscreen display device 10 through at least one of the plurality of conductive tips 2611 and 2612; and a pen controller 2624 transferring the signal intensity information, included in the uplink signal, to the transmitter circuit 2622. The signal intensity information may include information regarding at least one of the number of pulses of the downlink signal, a voltage level of the downlink signal, and the number of conductive tips generating the downlink signal among the plurality of conductive tips of the active pen.

The receiver circuit 2623 and the transmitter circuit 2622 may form a pair connected to the first communications module included in the touchscreen display device 10. The active pen 20 may include a Bluetooth module paired with the first communications module, and the receiver circuit 2623 and the transmitter circuit 2622 may be included in the Bluetooth module. However, the present disclosure is not limited thereto.

In addition, the plurality of conductive tips 2611 and 2612 may be referred to as a tip section 2610. The tip section 2610 may receive the uplink signal and output the downlink signal (e.g. an active pen signal for detecting a position or tilt or an active pen signal for transmitting data, such as additional information) corresponding to the uplink signal.

The plurality of conductive tips 2611 and 2612 may be spaced apart from each other by a certain distance. An isolator may be provided between the plurality of conductive tips and/or between the housing of the active pen and the plurality of conductive tips. One conductive tip 2611 of the plurality of conductive tips 2611 and 2612 is a contact conductive tip able to come into contact with the touchscreen display device, while at least one other conductive tip 2612 may be disposed around and at a distance from the contact conductive tip.

In addition, a value regarding the distance between one conductive tip 2611 and the other conductive tip 2612 may be included in the additional information, which may be output as being included in the downlink signal of the active pen 20. In addition, the signal output from each of one conductive tip 2611 and the other conductive tip 2612 is included in the downlink signal. The signal output from each of one conductive tip 2611 and the other conductive tip 2612 and the distance between one conductive tip 2611 and the other conductive tip 2612 may be used to determine the tilt (or inclination) of the active pen. Accordingly, the tilt of the active pen can be determined by intentionally designing the distance between one conductive tip 2611 and the other conductive tip 2612. Although the plurality of conductive tips 2611 and 2612 are illustrated as being two tips herein, the number of the tips is not limited thereto.

In addition, the downlink signal output from the active pen 20 according to aspects is a signal defined between the display panel 110 and the active pen 20, on the basis of a protocol, so that multi-active pen sensing, i.e. sensing of a plurality of active pens, is possible. The downlink signal may be output in response to the uplink signal, and may have an active pen ID corresponding to the unique information of the active pen 20. The active pen 20 may further include a memory (or storage) 2640 in which active pen IDs are stored. The memory 2640 may store information regarding the protocol according to which the pen controller 2624 operates. The information stored in the memory 2640 is not limited thereto.

In addition, the active pen 20 may include a sensor 2621 including a pressure sensor to detect a pressure (e.g. a writing pressure) applied to one of the plurality of conductive tips 2611 and 2612 of the tip section 2610 and/or a distance sensor to determine the distance from the touchscreen display device 10 on the basis of the intensity of the received uplink signal. The distance sensor, which might be realized as a separate sensor can determine the distance in response to the frequency of an electric field (i.e. uplink signal) and/or the intensity of the uplink signal received from the tip section 2610. The number and types of sensors included in the sensor 2621 are not limited thereto. However, the distance calculation might be performed by the pen controller based on the frequency of an electric field (i.e.

uplink signal) and/or the intensity of the uplink signal received from the tip section 2610.

The touchscreen display device 10, having received the downlink signal, can be paired with the active pen 20 that has transmitted the downlink signal. The active pen 20 can transfer the pressure information regarding the pressure, detected by the pressure sensor via the transmitter circuit 2622, or the distance information between the plurality of conductive tips and the touchscreen display device, determined by the distance sensor, to the touchscreen display device 10.

The pen controller 2624 can control the overall driving operations of the receiver circuit 2623, the transmitter circuit 2622, and the active pen 20. The pen controller 2624 can select the protocol depending on the uplink signal, and can be connected to the transmitter circuit 2622 outputting the downlink signal via the tip section 2610, in response to the uplink signal. The pen controller 2624 can determine the intensity of the downlink signal in response to the uplink signal.

Figure 9A:
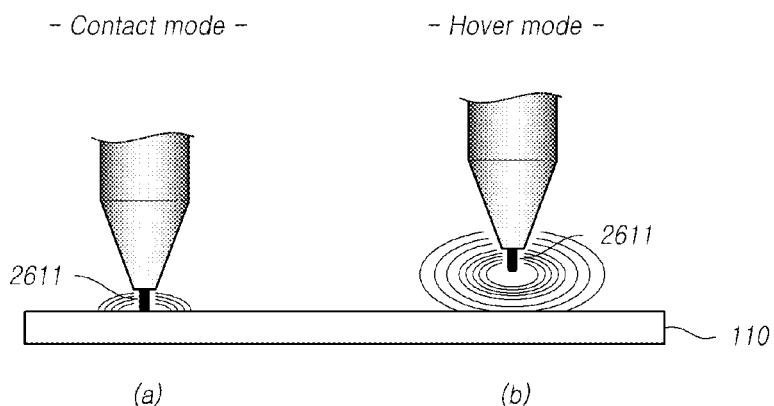
FIGS. 9A to 9C are conceptual views illustrating the signal intensities of a downlink signal.
Figure 9B:
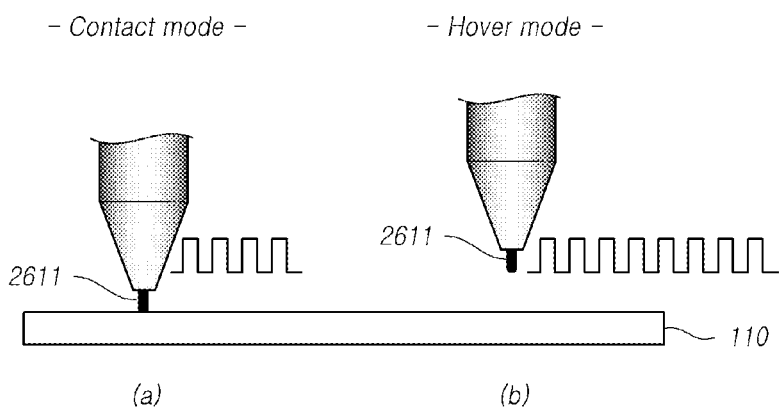
Figure 9C:
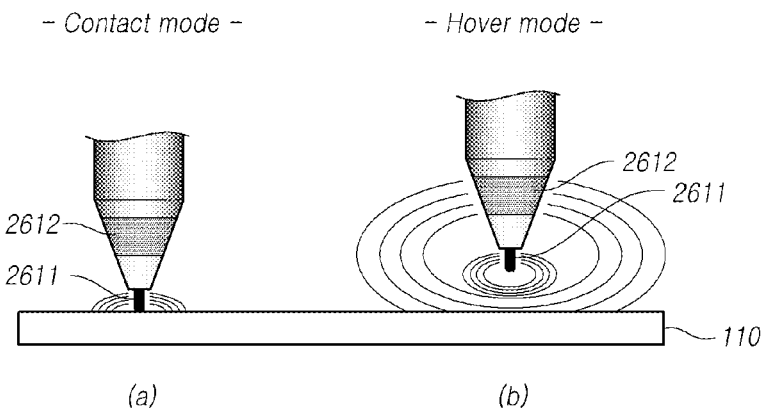

As illustrated in FIGS. 9A to 9C, the signal intensity information of the downlink signal, determined by the pen controller 2624, may include the number of pulses of the downlink signal, a voltage level of the downlink signal, and the number of conductive tips generating the downlink signal among the plurality of conductive tips of the active pen 20. That is, referring to (a) in FIG. 9A, when the active pen 20 is close to the touch sensor 120, e.g. in a contact mode, the downlink signal may have a low voltage level. In addition, referring to (b) in FIG. 9A, when the active pen 20 is at a certain distance (e.g. less than 5 cm) from the touch sensor 120, e.g. in a hover mode, the downlink signal may have a high voltage level. It is illustrated in FIG. 9A that circular electric fields are generated around the conductive tip 2611 depending on the voltage level, and the electric fields have different magnitudes. However, the voltage level is not limited thereto.

In addition, referring to (a) in FIG. 9B, when the active pen 20 is close to the touch sensor 120, e.g. in the contact mode, the downlink signal may have a smaller number of pulses. In contrast, referring to (b) in FIG. 9B, when the active pen 20 is at a certain distance from the touch sensor 120, e.g. in the hover mode, the downlink signal may have a greater number of pulses. However, the present disclosure is not limited to the number of pulses illustrated.

In addition, referring to (a) in FIG. 9C, when the active pen 20 is close to the touch sensor 120, e.g. in the contact mode, the downlink signal may be output from one conductive tip 2611. In contrast, referring to (b) in FIG. 9C, when the active pen 20 is at a certain distance from the touch sensor 120, e.g. in the hover mode, the downlink signal may be output from two conductive tips 2611. However, the number of the conductive tips generating the downlink signal is not limited thereto.

That is, in a case in which the active pen 20 is in contact with the display panel 110, the downlink signal may have a lower voltage level, may have a smaller number of pulses, or may be generated by a single conductive tip. As the active pen 20 moves further away from the display panel 110, the voltage level of the downlink signal, the number of pulses of the downlink signal, or the number of tips generating the downlink signal among the plurality of conductive tips of the active pen 20 may be increased.

In addition, the active pen 20 may further include a housing 2650 in which other peripheral devices, such as a battery 2630, buttons, and/or a pen display device, as well as the above-described variety of components, may be accommodated.

In addition, the pen controller 2624 can recognize the unique panel ID set to the display panel 110 by receiving an uplink signal from the tip section 2610, and generate a communications protocol for the display panel 110. In addition, the pen controller 2624 can control the timing of the transmitter circuit 2622, generate pressure information by receiving information regarding a pressure signal from the sensor 2621, and control other button signals. The pen controller 2624 may be a micro control unit (MCU). However, the present disclosure is not limited thereto.

The pen controller 2624 can select a protocol depending on a beacon, and control pulse generation timing in a pulse generator in response to a beacon or a ping signal.

The uplink signal received by the active pen 20 according to aspects may include a beacon.

The uplink signal received by the by the active pen 20 according to aspects may include spread spectrum codes.

A downlink signal output from the active pen 20 according to aspects may include a signal having a unique code corresponding to unique information of the active pen 20.

The downlink signal output from the active pen 20 according to aspects may include a signal having a unique frequency corresponding to unique information of the active pen 20.

Figure 10:
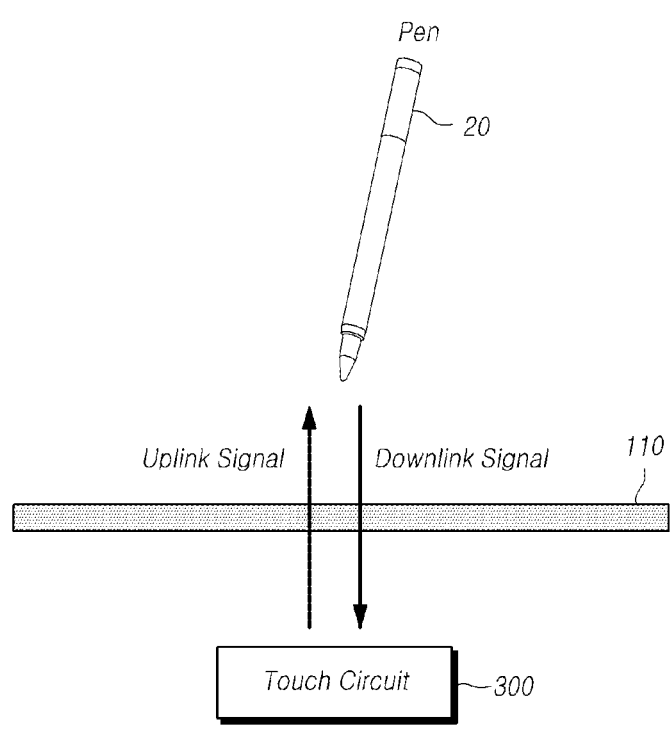
FIG. 10 illustrates a driving operation between the touchscreen display device and the active pen according to the present disclosure.

FIG. 10 illustrates a driving operation between the touchscreen display device and the active pen according to aspects.

Referring to FIG. 10, during the touch driving for the touch sensing of the active pen 20, the touchscreen display device 10 including the touchscreen display panel 110 transmits an uplink signal Uplink Signal to the active pen 20. The uplink signal Uplink Signal includes various pieces of information for controlling the driving of the active pen 20 or various pieces of information necessary for the driving of the active pen 20.

More specifically, the touch circuit 300 of the touchscreen display device 10 can supply the uplink signal Uplink Signal, including various pieces of information for controlling the driving of the active pen 20 or various pieces of information necessary for the driving of the active pen 20, to one or more touch electrodes TE among the plurality of touch electrodes TE in the display panel 110.

Responsively, the active pen 20 close to the display panel 110 may receive the uplink signal through the conductive tip. That is, the active pen 20 may receive the uplink signal via one or more touch electrodes TE among the plurality of touch electrodes TE in the display panel 110.

In response to the uplink signal transmitted from the touchscreen display device 10, the active pen 20 may output a downlink signal Downlink Signal indicating a position, tilt (inclination), or various pieces of additional information of the active pen 20. The downlink signal output from the active pen 20 may be applied to one or more touch electrodes TE among the plurality of touch electrodes TE in the display panel 110. The downlink signal may correspond to the downlink signal illustrated in FIG. 10.

The touch circuit 300 of the touchscreen display device 10 may receive the downlink signal, output from the active pen 20, via the touch electrodes TE, and obtain the position, tilt (inclination), or various pieces of additional information of the active pen 20 from the received downlink signal.

Here, the uplink signal may include, for example, a beacon or a ping signal, but is not limited thereto.

The beacon is a control signal by which the touchscreen display device 10 controls the driving of the active pen 20 or notifies of necessary information to the active pen 20. The beacon may include various pieces of information necessary for the driving of the active pen.

For example, the beacon may include at least one of panel information (e.g. panel state information, panel identification information, and panel type information regarding, for example, an in-cell type, an on-cell type, an add-on type, and the like), panel driving mode information (e.g. mode identification information regarding an active pen search mode, an active pen mode, and the like), downlink signal characteristics information (e.g. a frequency, the number of pulses, a voltage level, and the number of conductive tips outputting the downlink signal among the plurality of conductive tips), driving timing related information, multiplexer driving information, power mode information (e.g. information regarding LHB periods in which none of the panel and the active pen is driven to reduce power consumption), or the like. The beacon may further include information for synchronization between the driving of the display panel 110 and the driving of the active pen 20.

The ping signal may be a control signal for synchronization of the downlink signal.

Additional information, which may be included in the downlink signal, may include at least one from among, but is not limited to, a writing pressure, information regarding the distance between the touch sensor and the active pen, an active pen ID, button information, battery information, or information for checking and correcting an error in information.

Figure 11:
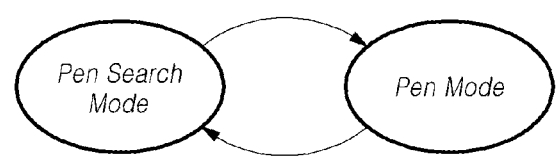
FIG. 11 is a mode transition diagram of an operation mode of an active pen sensing method according to the present disclosure.

FIG. 11 is a mode transition diagram of an operation mode of an active pen sensing method according to aspects.

Referring to FIG. 11, the operation mode of the active pen sensing method according to aspects may include an active pen search mode Pen Search Mode and an active pen mode Pen Mode. In the active pen search mode Pen Search Mode, the active pen 20 in contact with or close to the display panel 110 is searched for. In the active pen mode Pen Mode, the position of the active pen 20 and various pieces of information regarding the active pen 20 are detected, after the active pen 20 is searched in the active pen search mode.

Figure 12:
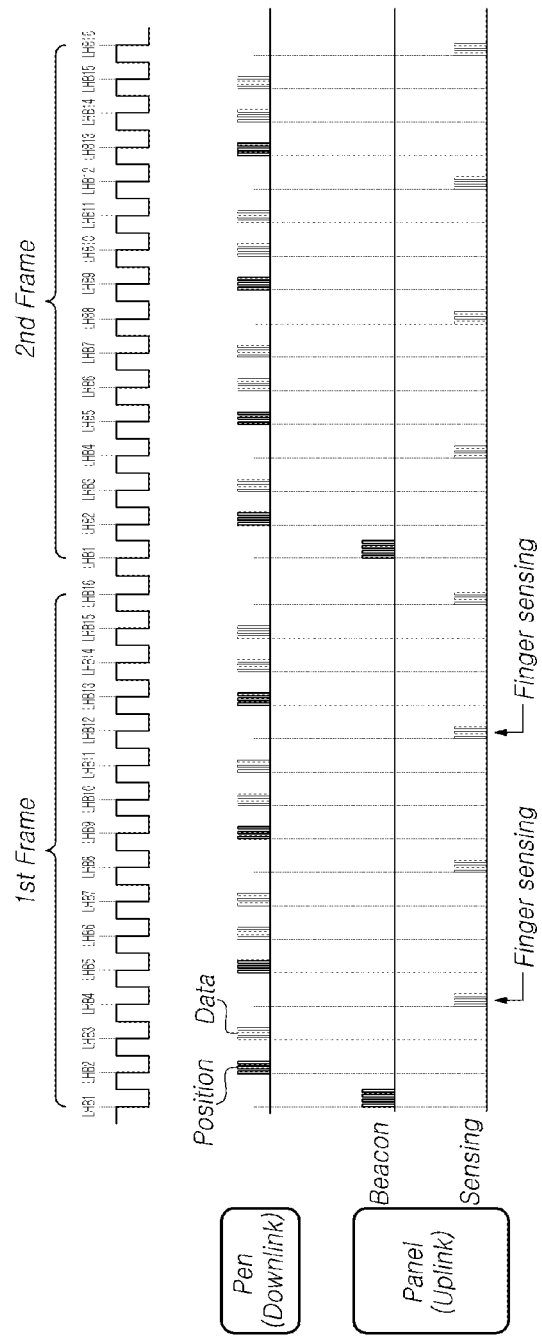
FIG. 12 is a driving timing diagram of the active pen mode in the touchscreen display system according to the present disclosure.

FIG. 12 is a driving timing diagram of the active pen mode in the touchscreen display system according to aspects.

Referring to FIG. 12, in the operation in the active pen mode, the downlink signal is output from the active pen 20 and various signals (including the uplink signal) are applied to the display panel 110 according to predetermined driving timing.

Each of a first frame period 1st Frame and a second frame period 2nd Frame may include, but is not limited to, sixteen LHB periods LHB1 to LHB16.

In each of the first frame period 1st Frame and the second frame period 2nd Frame, a beacon, one form of the uplink signal, may be transmitted once from the touchscreen display device 10 to the active pen 20. However, the present disclosure is not limited thereto, but the beacon may be transmitted once in the entirety of the first frame period 1st Frame and the second frame period 2nd Frame.

In a signal detection period among the sixteen LHB periods LHB1 to LHB16 included in each of the first frame period 1st Frame and the second frame period 2nd Frame, the beacon may be transmitted.

For example, in the first LHB period LHB1 among the sixteen LHB periods LHB1 to LHB16, included in each of the first frame period 1st Frame and the second frame period 2nd Frame, the beacon, included in the uplink signal, may be transmitted from the panel 110 to the active pen 20. In addition, in the remaining fifteen LHB periods LHB2 to LHB16, the downlink signal transferred from the active pen 20 may be detected. The detection of the downlink signal by the touch sensor may be referred to as "active pen sensing." However, the present disclosure is not limited thereto, a single LHB period may include a period in which the touch sensor 120 detects the downlink signal transferred from the active pen 20 and a period in which the touch sensor 120 detects a finger touch. That is, the downlink signal, transferred from the active pen 20, may be detected in some of the remaining fifteen LHB periods LHB2 to LHB16, while the finger touch may be detected in the others of the remaining fifteen LHB periods LHB2 to LHB16. The detection of the finger touch may be referred to as "finger sensing."

For example, in the first LHB period LHB1 among the sixteen LHB periods LHB1 to LHB16 included in each of the first frame period 1st Frame and the second frame period 2nd Frame, the beacon may be transmitted from the touchscreen display device 110 to the active pen 20. In addition, the active pen sensing may be performed in the second, third, and fifth to seventh LHB periods LHB2, LHB3, and LHB5 to LHB7, while the finger sensing may be performed in the fourth and eight LHB periods LHB 4 and LHB8.

In addition, when the beacon is output in the first LHB period LHB1, the first LHB period LHB1 may be an uplink signal output period, while the second to eight and tenth to sixteenth LHB periods LHB2 to LHB8 and LHB10 to LHB16 may correspond to a touch sensing period. Although the beacon is illustrated as being output in the first LHB period LHB1, the present disclosure is not limited thereto. In addition, the beacon signal may be output in the ninth LHB period LHB9.

In addition, the first LHB period LHB1 of the second frame period 2nd Frame may be time-divided. Time-divided fractions of the first LHB period LHB1 may be referred to as a first uplink signal output period and a second uplink signal output period, respectively. The uplink signal, output in the first uplink signal output period, may correspond to a first active pen among a plurality of active pens, while the uplink signal, output in the second uplink signal output period, may correspond to a second active pen among the plurality of active pens.

In addition, the beacon may be transmitted only in one frame period of the first LHB period LHB1 of the second frame period 2nd Frame. However, the present disclosure is not limited thereto.

When the beacon is transmitted from the touchscreen display device 10 to the active pen 20, the active pen 20 may output the downlink signal in a signal detection period determined according to a predefined protocol, in response to the beacon.

The downlink signal, output from the active pen 20, may be the downlink signal allowing the touchscreen display device 10 to detect the position of the active pen 20, or may be the downlink signal allowing the touchscreen display device 10 to detect data of the active pen 20. The data of the active pen 20 may be various pieces of information regarding the active pen 20, including a writing pressure, an active pen ID, button information, battery information, information for checking and correcting an error in information, etc.

The downlink signal output from the active pen 20 may be applied to one or more touch electrodes TE among the plurality of touch electrodes TE of the touch sensor 120.

The sixteen LHB periods LHB1 to LHB16, included in at least one of the first frame period 1st Frame and the second frame period 2nd Frame, may include one or more LHB periods (e.g. LHB2 to LHB3, LHB5 to LHB7, LHB9 to LHB11, LHB13 to LHB15) in which at least one of the position or data of the active pen 20 can be detected.

The active pen 20 may output the downlink signal in the LHB periods (e.g. LHB2 to LHB3, LHB5 to LHB7, LHB9 to LHB11, LHB13 to LHB15) allocated to the active pen sensing.

In a case in which the downlink signal output from the active pen 20 is the downlink signal for transmitting the position of the active pen 20, the downlink signal may be a signal comprised of pulses each of which periodically swings. In addition, in a case in which the downlink signal output from the active pen 20 is the downlink signal for transmitting the data of the active pen 20, the downlink signal may be a signal comprised of aperiodic pulses expressing the corresponding data.

In addition, the sixteen LHB periods LHB1 to LHB16, included in at least one of the first frame period 1st Frame or the second frame period 2nd Frame, may include one or more LHB periods (e.g. LHB4, LHB8, LHB12, LHB16) in which the finger touch can be detected.

When the downlink signal is output from the active pen 20 according to the active pen sensing timing defined by the protocol as described above, the touch circuit 300 may receive the downlink signal via the touch sensor 120, and perform active pen sensing processing Pen Sensing on the basis of the received downlink signal.

The active pen sensing processing may include at least one of the processing of detecting the position of the active pen 20 or the processing of detecting the data of the active pen 20.

In addition, according to finger sensing timing defined by the protocol, the touch circuit 300 may perform the finger sensing processing by supplying the touch driving signal to one or more touch electrodes TE of the panel 110, receiving the sensing signal from the panel 110, and detecting the finger touch.

Figure 13:
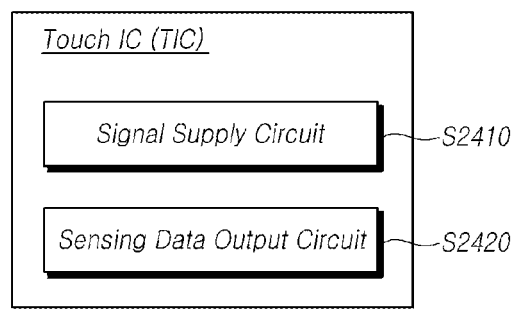
FIG. 13 is a block diagram of the touch circuit according to the present disclosure.

FIG. 13 is a block diagram of the touch circuit according to aspects.

Referring to FIG. 13, the touch circuit according to aspects may include a signal supply circuit S2410 and a sensing data output circuit S2420. The signal supply circuit S2410 may supply an uplink signal to one or more touch electrodes TE among the plurality of touch electrodes TE of the panel 110. After the uplink signal is supplied to the panel 110, if a downlink signal output from the active pen 20 is received via one or more touch electrodes TE among the plurality of touch electrodes TE of the panel 110, the sensing data output circuit S2420 may output active pen sensing data on the basis of the downlink signal.

After the uplink signal is supplied to the panel 110, if the downlink signal output from the active pen 20 is not output from the active pen 20 to the touchscreen display device 10 within a predetermined period, the signal supply circuit S2410 may retransmit the uplink signal to the touchscreen display device 10.

Figure 14:
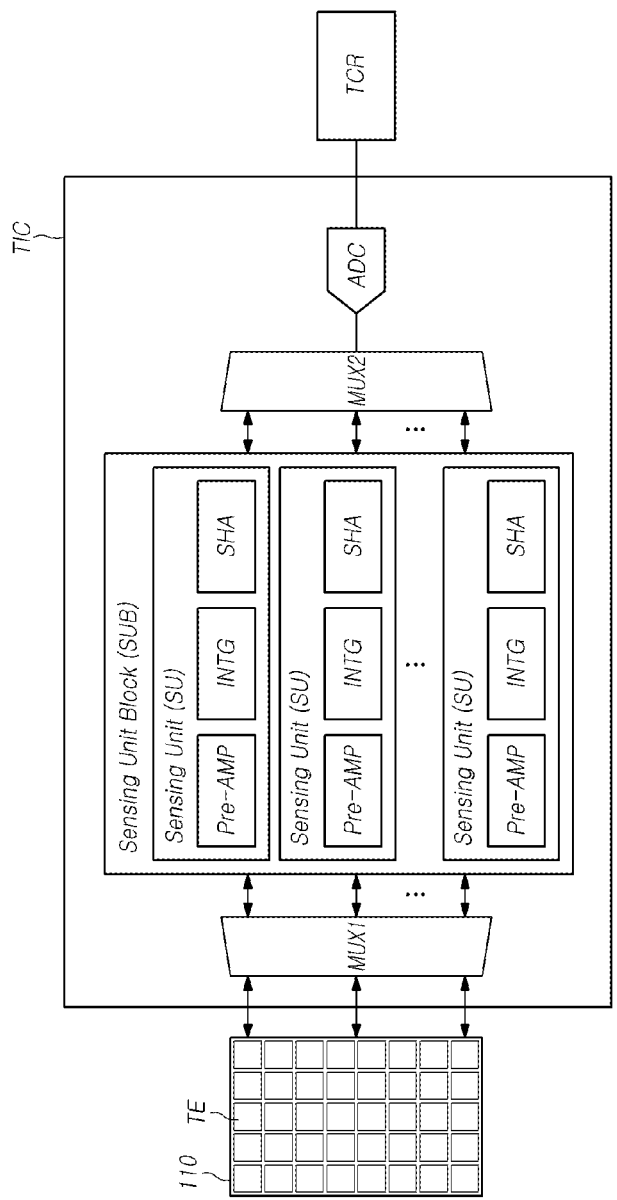
FIG. 14 is a block diagram of the touch circuit according to the present disclosure.

FIG. 14 is a block diagram of the touch circuit according to aspects.

Referring to FIG. 14, each of the touch ICs TIC according to aspects may include a first multiplexer circuit MUX1, a sensing unit block SUB including a plurality of sensing units SU, a second multiplexer circuit MUX2, and an analog-to-digital converter ADC.

The first multiplexer circuit MUX1 may include one or more multiplexers. The second multiplexer circuit MUX2 may include one or more multiplexers.

Each of the sensing units SU may include a pre-amplifier Pre-AMP, an integrator NITG, and a sample-and-hold circuit SHA.

The pre-amplifier Pre-AMP may be electrically connected to one or more touch electrodes TE via the first multiplexer circuit MUX1. The pre-amplifier Pre-AMP may supply a touch driving signal to one or more touch electrodes TE connected thereto via the first multiplexer circuit MUX1. It may receive a sensing signal from one touch electrode TE to be sensed, from among the one or more touch electrodes TE connectable via the first multiplexer circuit MUX1. Here, the sensing signal may be a sensing signal for detecting a finger touch or a downlink signal output from the active pen 20.

The integrator INTG integrates a signal output from the pre-amplifier Pre-AMP. The integrator INTG may be integrated into the pre-amplifier Pre-AMP. The sample-and-hold circuit SHA may store an integrated value output from the integrator INTG and then output the stored integrated value.

The analog-to-digital converter ADC may output sensing data, for example, digital data produced by converting the integrated value output from the integrator INTG, to the touch controller TCR.

Here, the sensing data may be touch sensing data for the finger touch sensing or pen sensing data for the pen touch sensing.

Figure 15:
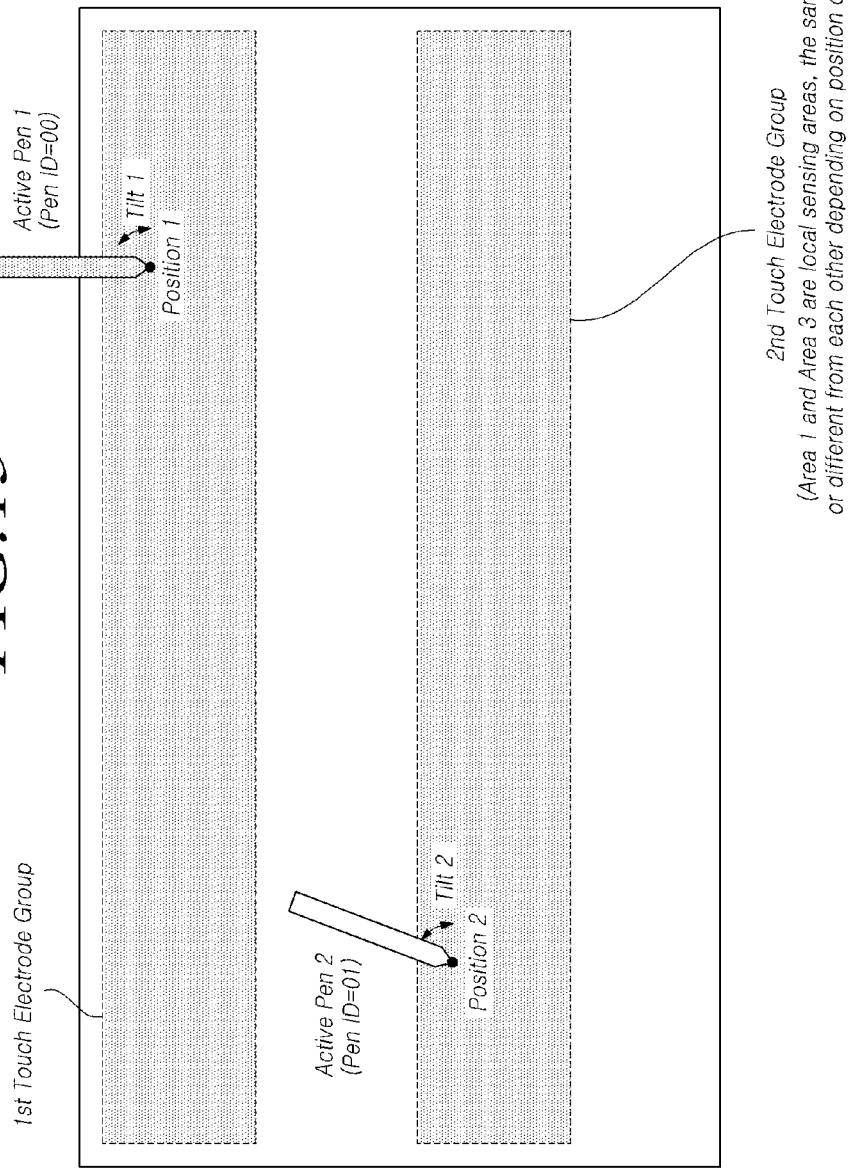
FIG. 15 illustrates a multi-active pen sensing situation in the touchscreen display device according to the present disclosure.

FIG. 15 illustrates a multi-active pen sensing situation in the touchscreen display device according to aspects.

Referring to FIG. 15, when a plurality of active pens are recognized as being located above the display panel 110, the display panel 110 may be driven in a local sensing mode to sense respective areas in which the active pens are located. That is, if a first active pen Active Pen 1 is located on a first touch electrode group, the display panel 110 may concentrically sense touch electrodes of the first touch electrode group to detect an output signal of the first active pen. If a second active pen Active Pen 2 is located on a second touch electrode group, the display panel 110 may concentrically sense touch electrodes of the second touch electrode group to detect an output signal of the second active pen. To distinguish the first active pen and the second active pen, pen IDs may be assigned to the active pens, and the respective active pens may be set to output different signals corresponding to the pen IDs thereof, so that the display panel 110 can distinguish the respective active pens by the pen IDs.

Figure 16:
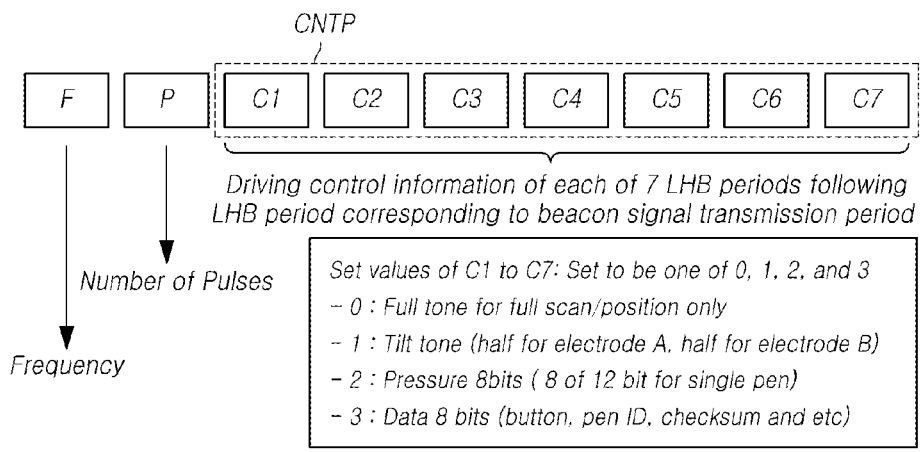
FIG. 16 illustrates a first aspect of a beacon signal format in the touch sensing system according to the present disclosure.

FIG. 16 illustrates a first aspect of a beacon signal format in the touch sensing system according to aspects.

Referring to FIG. 16, a beacon signal BCON may be a signal, in which direct sequence spread spectrum (DSSS) codes are used, so as to carry a large amount of data. The beacon signal BCON may include information by which touch sensing driving for an active pen touch performed by one or more active pens 20 is controlled.

Data included in the beacon signal BCON may include touchscreen panel information (or display panel information in a case in which the touchscreen panel is embedded in the display panel) and driving control information. As described above, the beacon signal BCON can notify the active pen 20, working in concert with the touchscreen display device 10, of how the active pen 20 will be driven in one or more LHB periods following the LHB period LHB1, in which the beacon signal BCON is transmitted. The active pen 20 can perform driving corresponding to the driving of the touchscreen display device 10 by referring to the beacon signal BCON. Accordingly, accurate active pen recognition (e.g. active pen touch sensing) can be performed.

In a case in which the beacon signal transmission signal is included in a single frame period, for example, the first signal detection period LHB1 and the ninth signal detection period LHB9 are beacon signal transmission periods, the amount of information carried by the beacon signal BCON can be reduced. Consequently, the processing load of the touch circuit TC to generate the beacon signal BCON and the processing load of the active pen to receive and read in the beacon signal BCON can be reduced.

During one or more signal detection periods LHB2 to LHB8 present between the first signal detection period LHB1 and the ninth signal detection period LHB9, the downlink signal output from the active pen may have different intensities, depending on the beacon signal BCON transmitted in the first signal detection period LHB1. That is, if the active pen 20 is spaced apart from the touchscreen display device 10, the intensity of the downlink signal may be increased. If the active pen 20 is close to the touchscreen display device 10, the intensity of the downlink signal may be reduced. The intensity of the downlink signal may correspond to a voltage level of the downlink signal, the number of pulses of the downlink signal, and the number of conductive tips outputting the downlink signal.

During one or more signal detection period LHB2 to LHB8 present between the first signal detection period LHB1 and the ninth signal detection period LHB9, the active pen 20 may operate in different operation modes, depending on the beacon signal BCON transmitted in the first signal detection period LHB1.

Here, the operation modes of the active pen 20 may be an active search mode Pen Searching Mode and active pen mode Pen Mode related to active pen search, active pen information specific recognition, additional active pen search, and the like, may be a full sensing mode and a local sensing mode related to sensing areas, or may be a full tone mode and a tilt tone mode related to types of active pen signals or types of active pen recognition information.

As described above, the touchscreen display device 10 and the active pen 20 can share operation modes thereof and accurately perform operations according to the corresponding operation modes, on the basis of the beacon signal BCON. Accordingly, the touchscreen display device 10 and the active pen 20 can perform an active pen recognition driving operation by accurately working in concert with each other.

During one or more LHB periods LHB2 to LHB8 present between the first LHB period LHB1 and the ninth LHB period LHB9, the active pen signal (i.e. AC signal including a plurality of pulses) output from the active pen may have different frequencies, depending on the beacon signal BCON transmitted in the first LHB period LHB1.

Accordingly, the active pen 20 can generate an active pen signal having a frequency by which the touch circuit 300 can detect and process the signal. Since the touch circuit 300 can accurately receive and recognize the active pen signal having the frequency, the touch circuit 300 can recognize and process the signal, via the touch sensor 120, thereby accurately recognizing the active pen 20.

The number of one or more LHB periods LHB2 to LHB8 present between the first LHB period LHB1 and the ninth LHB period LHB9 may vary, depending on the beacon signal BCON transmitted in the first LHB period LHB1.

Accordingly, the active pen 20 can accurately determine a period or periods, in which the driving operation according to driving control information obtained from the beacon signal BCON is to be performed, so as to accurately work in concert with the touchscreen display device 10.

For the driving control based on the beacon signal BCON as described above, data in the beacon signal BCON may include an active pen ID and active pen state. In addition, the beacon signal BCON may include information for driving synchronization between the touchscreen panel TSP and the active pen. That is, the beacon signal BCON may also serve as a ping signal.

Various pieces of information included in the beacon signal BCON may be retained in a memory of the touchscreen display device 10. Here, the memory may be previously described with reference to a memory of the active pen 20. However, the present disclosure is not limited thereto.

Figure 17:
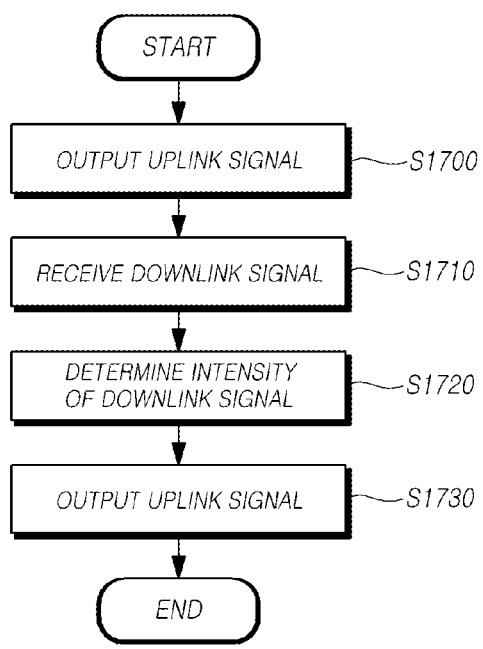
FIG. 17 is a flowchart illustrating a driving method of the active pen according to the present disclosure.

FIG. 17 is a flowchart illustrating a driving method of the active pen according to aspects.

Referring to FIG. 17, the touchscreen display device 10 may output an uplink signal in S1700. Describing more specifically, a beacon signal BCON may be output in a first LHB period LHB1 of a one-frame period. The output beacon signal BCON may be received by all of the active pens 20 close to the touchscreen display device 10. When the active pens 20 are turned on, each of the active pens 20 may operate in a hover mode. The active pen 20 operating in the hover mode may receive an uplink signal output from the touchscreen display device 10. That is, the active pen 20 may receive the beacon signal BCON.

In S1710, the touchscreen display device 10 may receive a downlink signal from the active pen 20 that has received the beacon signal BCON. The touchscreen display device 10 may receive the downlink signal using the touch sensor 120 thereof. However, the present disclosure is not limited thereto, but the first communications module 310 of the touchscreen display device 10 may receive the downlink signal from the active pen 20. In a case which the first communications module 310 receives the downlink signal from the active pen 20, the downlink signal may be transmitted from a second communications module (not shown) of the active pen 20. However, the present disclosure is not limited thereto.

The touchscreen display device 10 that has received the downlink signal may be paired with the active pen 20 that has transmitted the downlink signal. For example, the first communications module 310 of the touchscreen display device 10 may be paired with the second communications module of the active pen 20. The second communications module may transfer pressure information regarding a pressure detected by a pressure sensor or distance information regarding the distance between the plurality of conductive tips and the touchscreen display device, calculated by the distance sensor, to the touchscreen display device 10.

The downlink signal, transmitted from the active pen 20 to the touchscreen display device 10, may include information regarding the distance between the active pen 20 and the touchscreen display device 10. The active pen 20 may generate the distance information by calculating the distance between the active pen 20 and the touchscreen display device using the intensity of the uplink signal. In addition, the active pen 20 can generate the distance information by detecting a pressure using the pressure sensor. More specifically, if a pressure is detected, the active pen 20 determines that the active pen 20 has contacted the touchscreen display device 10. If no pressure is detected, the active pen 20 determines that the active pen 20 has not contacted the touchscreen display device 10. In addition, the downlink signal may include the active pen ID of the active pen 20.

In addition, the touchscreen display device 10 may be paired with one or more active pens 20. The touchscreen display device 10 may identify one or more active pens 20 and determine the distance from the one or more active pens 20, using the active pen ID and distance information included in the downlink signal.

In S1720, the touchscreen display device 10 may determine the intensity of the downlink signal received from the active pen 20. The touchscreen display device 10 may determine the intensity of the downlink signal in an active pen sensing period of a one-frame period. The period in which the intensity of the downlink signal is determined may be, for example, second, third, and fifth to seventh LHB periods LHB2, LHB3, and LHB5 to LHB7 among the sixteen LHB periods LHB1 to LHB16 included in each of the first frame period 1st Frame and the second frame period 2nd Frame.

The touchscreen display device 10 may control the active pen 20 to reduce the intensity of the downlink signal if the downlink signal has a relatively-high intensity and to increase the intensity of the downlink signal if the downlink signal has a relatively-low intensity.

In S1730, the touchscreen display device 10 may output the uplink signal. The uplink signal may include information regarding the intensity of the downlink signal and the active pen ID. The active pen 20 may output the downlink signal by adjusting the intensity thereof, on the basis of information regarding the intensity of the downlink signal received from the touchscreen display device 10. In addition, the active pen 20 may output the downlink signal in response to the uplink signal if the active pen ID included in the uplink signal is the active pen ID thereof.

Hover mode different steps 1, 2 and 3 are based on distance.

The foregoing descriptions and the accompanying drawings have been presented in order to explain certain principles of the present disclosure by way of example. A person having ordinary skill in the art to which the present disclosure relates could make various modifications and variations by combining, dividing, substituting for, or changing the elements without departing from the principle of the present disclosure. The foregoing aspects disclosed herein shall be interpreted as being illustrative, while not being limitative, of the principle and scope of the present disclosure. It should be understood that the scope of the present disclosure shall be defined by the appended Claims and all of their equivalents fall within the scope of the present disclosure.

What is claimed is:

1. A touchscreen display device comprising:
a display panel;
a touch sensor disposed in an area corresponding to the display panel, the touch sensor configured to output an uplink signal including signal intensity information corresponding to an intensity of a downlink signal output from an active pen; and
a touch circuit configured to control the touch sensor to output the uplink signal,
wherein the uplink signal is output during an uplink signal output period of a signal detection period and the downlink signal output from the active pen is detected in a touch sensing period of the signal detection period, and
wherein the display device is operated to include at least one display period and at least one signal detection period that are repeatedly disposed during a one-frame period.

2. The touchscreen display device according to claim 1, wherein the touch sensor is configured to output a position information signal corresponding to a touched position on the display panel in response to the downlink signal to the touch circuit, and
wherein the touch circuit is configured to receive the position information signal from the touch sensor in response to the downlink signal output from the active pen.

3. The touchscreen display device according to claim 2, further comprising a timing controller configured to control driving of the display panel and configured to control an image to be displayed on the display panel in response to the position information signal.

4. The touchscreen display device according to claim 1, wherein the signal intensity information includes information regarding at least one of a number of pulses of the downlink signal, a voltage level of the downlink signal and a number of conductive tips of the active pen generating the downlink signal among the plurality of conductive tips of the active pen.

5. The touchscreen display device according to claim 1, further comprising a first communications module configured to receive status information of the active pen.

6. The touchscreen display device according to 5, wherein the status information includes pressure information regarding a pressure detected by the active pen or distance information regarding the distance between the active pen and the touchscreen display device.

7. The touchscreen display device according to claim 1, wherein the uplink signal further includes a pen ID of the active pen.

8. The touchscreen display device according to claim 1, wherein the touch sensing periods are time-divided into first touch sensing periods and second touch sensing periods, and
wherein the downlink signal corresponds to a first active pen among a plurality of active pens in the first touch sensing periods and corresponds to a second active pen among the plurality of active pens in the second touch sensing periods.

9. The touchscreen display device according to claim 1, wherein the uplink signal output periods are time-divided into first uplink signal output periods and second uplink signal output periods, and
wherein the uplink signal corresponds to a first active pen among the plurality of active pens in the first uplink signal output periods and corresponds to a second active pen among the plurality of active pens in the second uplink signal output periods.

10. The touchscreen display device according to claim 1, wherein the signal detection period includes a period in which the touch sensor is configured to detect the downlink signal transferred from the active pen and a period in which the touch sensor is configured to detect a finger touch.

11. The touchscreen display device according to claim 1, wherein the uplink signal is transmitted via one or more touch electrodes of the touch sensor to the active pen, and downlink signal is received by the touch sensor via the one or more touch electrodes.

12. A touchscreen display device comprising:
a display panel;
a plurality of touch sensors disposed in the display panel, configured to detect a signal output from an active pen or a finger touch in a touch sensing period of the display panel and configured to output an uplink signal including signal intensity information corresponding to an intensity of a downlink signal output from the active pen in an uplink signal output period of the display panel; and a touch circuit configured to control the plurality of touch sensors to output the uplink signal, wherein the uplink signal includes information regarding a driving mode of the active pen according to a distance between a tip of the active pen and a touch sensor of the plurality of touch sensors, wherein the uplink signal output period is time-divided into a first uplink signal output period and a second uplink signal output period, and wherein the uplink signal output in the first uplink signal output period corresponds to a first active pen among a plurality of active pens, and the uplink signal output in the second uplink signal output period corresponds to a second active pen among the plurality of active pens.

13. The touchscreen display device according to claim 12, wherein the information regarding the driving mode of the active pen includes information regarding at least one of a number of pulses of the downlink signal, a voltage level of the downlink signal, a number of conductive tips generating the downlink signal among a plurality of conductive tips of the active pen, and an active pen ID of the active pen.

14. The touchscreen display device according to claim 12, wherein the touch circuit is configured to obtain information regarding an inclination of the active pen in response to the downlink signal output from a plurality of conductive tips of the active pen.

15. A touch sensing system comprising a touchscreen display device and at least one active pen, wherein the touchscreen display device includes a touch sensor, wherein the touch sensor is configured to output an uplink signal to the active pen and the active pen is configured to output a downlink signal to the touchscreen display device, wherein the distance between the touch sensor and a tip of the active pen is calculated based on a signal intensity of the uplink signal and/or downlink signal, wherein an operation mode of the active pen is set based on the calculated distance, wherein the uplink signal is output during an uplink signal output period of a signal detection period and the downlink signal output from the active pen is detected in a touch sensing period of the signal detection period, and wherein the display device is operated to include at least one display period and at least one signal detection period that are repeatedly disposed during a one-frame period.

* * * * *